US008478746B2

(12) United States Patent
Yu et al.

(10) Patent No.: US 8,478,746 B2
(45) Date of Patent: *Jul. 2, 2013

(54) OPERATIONALIZING SEARCH ENGINE OPTIMIZATION

(75) Inventors: Jimmy Yu, Foster City, CA (US); Sammy Yu, San Mateo, CA (US); Lemuel S. Park, Cerritos, CA (US); Rolland Yip, Ma On Shan (HK)

(73) Assignee: Brightedge Technologies, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/368,859

(22) Filed: Feb. 8, 2012

(65) Prior Publication Data

US 2012/0143855 A1   Jun. 7, 2012

Related U.S. Application Data

(63) Continuation of application No. 12/855,668, filed on Aug. 12, 2010, now Pat. No. 8,135,706.

(51) Int. Cl.
*G06F 17/30* (2006.01)
*G06Q 30/00* (2012.01)

(52) U.S. Cl.
USPC ............................. 707/722; 705/14.49

(58) Field of Classification Search
None
See application file for complete search history.

(56) References Cited

U.S. PATENT DOCUMENTS

| | | | |
|---|---|---|---|
| 7,584,194 B2 | 9/2009 | Tuttle et al. | |
| 7,801,881 B1 | 9/2010 | Brawer et al. | |
| 2002/0169865 A1* | 11/2002 | Tarnoff | 709/223 |
| 2005/0223061 A1 | 10/2005 | Auerbach et al. | |
| 2006/0282328 A1 | 12/2006 | Gerace et al. | |
| 2007/0198459 A1 | 8/2007 | Boone et al. | |
| 2008/0010142 A1* | 1/2008 | O'Brien et al. | 705/14 |
| 2008/0162699 A1 | 7/2008 | Gaffney | |
| 2008/0201324 A1 | 8/2008 | Aronowich et al. | |
| 2009/0299998 A1* | 12/2009 | Kim | 707/5 |
| 2009/0319365 A1* | 12/2009 | Waggoner et al. | 705/14.41 |
| 2010/0114899 A1* | 5/2010 | Guha et al. | 707/741 |
| 2010/0121707 A1* | 5/2010 | Goeldi | 705/14.49 |
| 2010/0241510 A1 | 9/2010 | Zhang | |
| 2011/0004483 A1* | 1/2011 | Ting et al. | 705/1.1 |
| 2011/0213822 A1 | 9/2011 | Yavilevich | |
| 2011/0247074 A1* | 10/2011 | Manring et al. | 726/26 |
| 2011/0282730 A1* | 11/2011 | Tarmas | 705/14.42 |

OTHER PUBLICATIONS

United States Office Action mailed Jul. 20, 2011 as received in U.S. Appl. No. 12/436,704.
United States Office Action mailed Sep. 27, 2011 as received in U.S. Appl. No. 12/574,069.

* cited by examiner

*Primary Examiner* — Tarek Chbouki
(74) *Attorney, Agent, or Firm* — Maschoff Brennan (57) ABSTRACT

A method for managing reference to an entity on a network includes determining shares of voice for an entity and other entities across a plurality of channels with respect to a plurality of search terms. The method also includes correlating shares of voice for the entity and the other entities with respect the search terms to determine a relative change in share of voice for the entity with respect to the other entities. Thereafter, shares of voice for the entity across the plurality of channels may be correlated to determine relative changes in share of voice for the entity within each of the channels. The relative change in share of voice for the entity with respect to the other entities and the relative changes in share of voice for the entity within each of the channels may then be displayed.

20 Claims, 5 Drawing Sheets

OPERATIONALIZING SEARCH ENGINE OPTIMIZATION

CROSS-REFERENCE TO RELATED APPLICATIONS

This patent application is a continuation of U.S. patent application Ser. No. 12/855,668, filed on Aug. 12, 2010, which is incorporated herein by reference.

BACKGROUND OF THE INVENTION

The Internet has changed the way people gather information, establish relationships with one another and even how people communicate with one another. Additionally, the Internet has changed the way companies seek potential customers and even what the meaning of a business is. It has changed the way companies advertise, sell, coordinate with one another and compete with one another. With this change has come a huge explosion in the number of Web Pages for people to visit. Search engines, such as Google, Bing, Yahoo and others have come into being to help people find their way to Web Pages that they desire. As a result, the number and types of channels that a marketer can leverage has also exploded—beyond organic and paid search, they can also leverage blogs, social media, video sharing, mobile content and ads, display ads, and many other channels.

Additionally, tracking the behavior of the actions of each visitor would allow the Web Page to be marketed more efficiently. In particular, many Web Pages track their organic search performance in search engines based on number of visits for certain keywords. However, they cannot determine how many visitors came as a result of a particular search engine result and rank position to the Web Page, instead they must estimate this based on the data (referral header) passed to the web page which only helps them determine the number of visitors that came from a specific keyword. Without understanding key attributes of their performance on the search engine, they cannot accurately determine the effectiveness of their marketing efforts. Moreover, they cannot determine how their organic search marketing efforts would impact what those visitors do on the Web Page when they have found the Web Page. For example, if a Web Page is selling merchandise, there is currently no way to determine who completed a particular purchase on the Web Page and compare that with how that visitor came to the Web Page.

Therefore, owners and designers of Web Pages must estimate how visitors have come to the Web Page and what they do once they are on the Web Page. This does not allow them to determine which actions would present a better chance for success of the Web Page. For example, a Web Page owner might be confronted with limited marketing budgets that allow them to either improve their ranking in search engine results or that will place advertisements for their Web Page on other Web Pages but not both. Currently, the Web Page owner must choose which strategy to follow with limited information on which would be more effective.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

A method for managing reference to an entity on a network includes determining shares of voice for an entity and other entities across a plurality of channels with respect to a plurality of search terms. The method also includes correlating shares of voice for the entity and the other entities with respect the search terms to determine a relative change in share of voice for the entity with respect to the other entities. Thereafter, shares of voice for the entity across the plurality of channels may be correlated to determine relative changes in share of voice for the entity within each of the channels. The relative change in share of voice for the entity with respect to the other entities and the relative changes in share of voice for the entity within each of the channels may then be displayed.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Systems and methods are provided herein for determining shares of voice, both for the entity and other entities, with respect to selected search terms across channels and over time. Systems and methods are also provided herein for determining causes in changes of performance based on analyses of the shares of voice. Further, through analysis of the shares of voice the systems and methods can manage high impact search terms and opportunities. The system is also able to determine return on investment for targeting and managing high impact search terms as well as initiatives over time and across channels. In addition, the system is configured to determine and ensure compliance to optimization standards.

Figure 1:
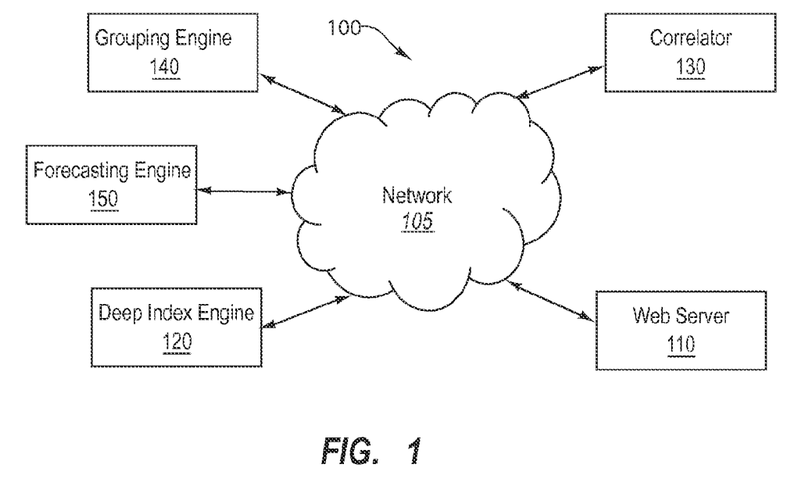
FIG. 1 illustrates a block diagram of a system 100 configured to manage activities associated with an entity according to one example.

FIG. 1 illustrates a block diagram of a system 100 configured to manage activities associated with an entity. In at least one example, the system 100 is configured to determine and track shares of voice for a selected entity and other entities, such as competitors. Entities can include individuals, corporations, brands, products, models or any other entities referenced anywhere on a network such as the Internet. The references may include links and/or references to one or more web pages or other media, such as display advertisements, associated with the entity. Accordingly, the references can include organic references, online advertisements including display advertisements, news items or any other reference to the entity.

FIG. 1 shows that the system 100 can include a network 105. In at least one implementation, the network 105 can be used to connect the various parts of the system 100 to one another, such as between a web server 110, a deep index engine 120, a correlator 130, grouping engine 140, and a forecasting engine 150. It will be appreciated that while these components are being shown as separate that the components may be combined as desired. Further, while one of each component is illustrated, it will be appreciated that the system 100 may include any number of each of the components shown. In at least one example, the system 100 is configured to determine a share of voice an entity has for search terms and groups of search terms within and across various channels using the components described herein. The system 100 may be further configured to track the entity's share of voice for the search terms over time. The system 100 may also be configured to determine a share of voice different entities have for the same search terms. By tracking the entity's share of voice and other entities shares of voice over time, all of which may be tracked across channels, the system 100 can isolate causes for changes in performance.

As will be discussed in more detail hereinafter, the grouping engine 140 is configured to determine meaningful groupings of information to provide methods, processes and platforms to manage content and relevant marketing data (SEO metrics) at scale for large entities possessing a large amount of content and marketing data. The groupings can be user defined, customized with technology intervention, or automatically generated based on intelligent analysis that combines internal/third party/external data. As a result, the system 100 is configured to perform methods for aggregating content and SEO metrics in meaningful groupings that can then be tracked and measured. Analysis can be performed at these groupings that will give meaningful and actionable information to the marketer due to the nature of the segmentation of the groups. Such a configuration can allow the system 100 to manage changes to share of voice over time and identify potential opportunities.

As will be discussed in more detail hereinafter, the forecasting engine 150 is configured to determine a search term or search terms to optimize. The search term or terms may be selected from a group or basket of known search terms that may affect actions related to the entity. The forecasting engine 150 may also be configured to help marketers forecast the business value of optimization initiatives (e.g., if I work on optimizing for a given 5 keywords, what is the likely result in improvement in my search engine rank position and how much more incremental revenue will be generated from the improvement) and also take into account the difficulty and expense associated with the initiative. The forecasting engine may be further configured to determine causes in changes of performance based on analyses of the shares of voice. Further, through analysis of the shares of voice the systems and methods can manage high impact search terms and opportunities. The system is also able to determine return on investment for targeting and managing high impact search terms as well as initiatives over time and across channels.

In at least one example, the network 105 includes the Internet, including a global internetwork formed by logical and physical connections between multiple wide area networks and/or local area networks and can optionally include the World Wide Web ("Web"), including a system of interlinked hypertext documents accessed via the Internet. Alternately or additionally, the network 105 includes one or more cellular RF networks and/or one or more wired and/or wireless networks such as, but not limited to, 802.xx networks, Bluetooth access points, wireless access points, IP-based networks, or the like. The network 105 can also include servers that enable one type of network to interface with another type of network.

In at least one implementation, the web server 110 (or "webserver") can include any system capable of storing and transmitting a Web Page to a user. For example, the web server 110 can include a computer program that is responsible for accepting requests from clients (user agents such as web browsers), and serving them HTTP responses along with optional data contents, which can include HTML documents and linked objects for display to the user. Additionally or alternatively, the web server 110 can include the capability of logging some detailed information about client requests and server responses, to log files.

The entity can include any number of Web Pages. The aggregation of references to the various Web Pages can be referred to as traffic. It should be noted that "Web Page" as used herein refers to any online posting, including domains, subdomains, Web posts, Uniform Resource Identifiers ("URIs"), Uniform Resource Locators ("URLs"), images, videos, or other piece of content and non-permanent postings such as e-mail and chat unless otherwise specified.

In at least one implementation, external references to a Web Page can include any reference to the Web Page which directs a visitor to the Web Page. For example, an external reference can include text documents, such as blogs, news items, customer reviews, e-mails or any other text document which discusses the Web Page. Additionally or alternatively, an external reference can include a Web Page which includes a link to the Web Page. For example, an external reference can include other Web Pages, search engine results pages, advertisements or the like.

In the illustrated example, the deep index engine 120 is configured to use search terms identified above to perform a search of the network to identify references to the entity. The deep index engine 120 is further configured to score the results of the search of the network with respect to the entity. This score may include a position at which references to the entity are displayed within the search results. The score may also optionally include compliance/non-compliance values. The relative position of the references to the entity within the search result can affect how the references affect actions related to the entity. Accordingly, by determining the relative position of the references within search results, the deep index engine 120 is able to determine a current performance metric for each of the search terms as they relate to the entity.

Additionally or alternatively, the deep index engine 120 may be configured to score the search results for each of the search terms with respect to other entities, including entities found in the competitive listing for the search results. Accordingly, the deep index engine 120 may be configured to gather external data related to performance of other entities to establish current baselines for those entities as well.

Additionally or alternatively, the deep index engine 120 may be further configured to crawl the search results related to each of the search terms to retrieve external data. In particular, the deep index engine 120 may be configured to crawl the search results for each of the search terms and analyze data associated with the crawl, including on-page information and back link data (e.g. back link URL, anchor text, etc) for each URL in the search result. The deep index engine 120 may then analyze the data to identify additional search terms that may be relevant to the entity, but which may not have been searched or on which the entity does not rank. In at least one example, this analysis may include conducting a keyword frequency search. Accordingly, the deep index engine 120 may be configured to surface additional search terms. In at least one example, these additional search terms and opportunities identified and targeted in any channel (SEO, paid search, social networks, etc.). Cross-channel opportunities are also a part of the opportunity identification (e.g. if a customer is not ranking on a keyword on organic search that a competitor ranks on, the customer can immediately target this keyword in paid search). Other external data may include compliance/non-compliance values. It will be appreciated that compliance/non-compliance values may also be retrieved as internal data as well.

An exemplary deep index engine is described in more detail in co-pending U.S. patent application Ser. No. 12/436,704 entitled "COLLECTING AND SCORING ONLINE REFERENCES" filed May 6, 2009, the disclosure of which is hereby incorporated by reference in its entirety.

Additional current performance metrics may include internal data determined by the correlator 130. In at least one implementation, the correlator 130 can determine how visitors are directed to the entity and how those visitors behave once there. For example, the correlator 130 can correlate conversion of visits to the search terms that drove the visits.

An exemplary correlator is described in more detail in co-pending U.S. patent application Ser. No. 12/574,069 filed Oct. 6, 2009 and entitled "CORRELATING WEB PAGE VISITS AND CONVERSIONS WITH EXTERNAL REFERENCES" the disclosure of which is hereby incorporated by reference in its entirety.

As will be discussed in more detail hereinafter, the forecasting engine 150 may receive data from third parties including information about network activity related to the search terms described above. The forecasting engine 150 may also be configured to receive the internal data, including the output of the correlator 130 as well as external data, including the output of the deep index engine 120. The forecasting engine 150 may use the internal data, the third party data, and the external data to identify opportunities for optimizing placement of references to the entity as well as to forecasting the likely costs and benefits of improving references to the entity. This may allow the system to determine causes in changes of performance based on analyses of the shares of voice. Further, through analysis of the shares of voice, the systems and methods can manage high impact search terms and opportunities. The system is also able to determine return on investment for targeting and managing high impact search terms as well as initiatives over time and across channels.

In brief summary, the system may be configured to determine shares of voice, both for the entity and other entities, with respect to selected search terms across channels and over time. The system is also configured to determine causes in changes of performance based on analysis of the shares of voice. Further, through analysis of the shares of voice, the system can manage high impact search terms and opportunities. The system is also able to determine return on investment for targeting and managing high impact search terms as well as initiatives over time and across channels. In addition, the system is configured to determine and ensure compliance to optimization standards. Each of these aspects will be described in more detail in turn below.

Figure 2:
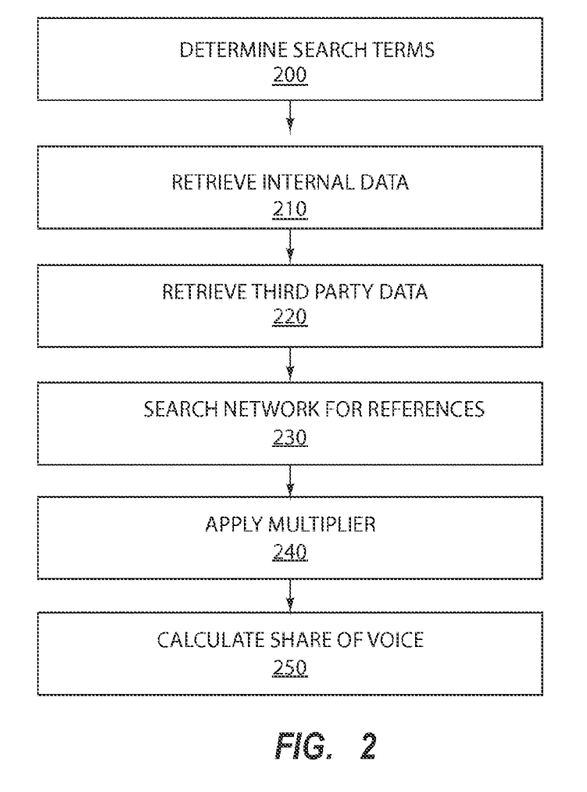
FIG. 2 illustrates a flowchart for determining shares of voice according to one example.

FIG. 2 illustrates a flowchart for determining shares of voice. The method can be implemented using software, hardware or any combination thereof. If the method is implemented using hardware, the steps of the method can be stored in a computer-readable medium, to be accessed as needed to perform their functions. Additionally, if the method is implemented using software, the steps can be carried out by a processor, field-programmable gate array (FPGA) or any other logic device capable of carrying out software instructions or other logic functions.

Additionally or alternatively, the method can be implemented using a server or other single computing environment. If a server or other single computing environment is utilized, the conversions need not be divided into groups, since all conversions will be analyzed by the same server or single computing environment.

As illustrated in FIG. 2, the method begins at step 200 by determining search terms. In at least one example, search terms may include keywords retrieved from a keyword database. The keyword database contains one or more keywords to be used in the page search. Further, search terms may received by input from a user. In some embodiments, additional search terms may be surfaced by crawling search results of previously searched terms, including those retrieved from a keyword database and/or received by input from a user.

At step 210, internal data is retrieved related to the search terms. For example, previous actions related to the network to determine a total number of conversions associated with the search terms as well as the total value of those conversions. This internal data may be retrieved or calculated in any desired manner. The internal data can also include information identifying which channels were associated with the values and conversions.

The method also includes at step 220 retrieving third party data related to the search terms. This third party data may include any desired information, including information about network activity such as traffic or visits related to the search terms. Third party data may also include information about the channels in which the traffic or visits occurred. For example, third party data may include, without limitation, search engine data such as cost per click (CPC) values for the search terms, search frequency for the keywords, and any other desired data that may be provided by third parties. Requests for and/or receipt of third party data may take place at any point, including simultaneously with retrieving internal data related to the search terms at step 200.

Still referring to FIG. 2, the method also includes at step 230 performing a search in which the search terms are used to search the network for references to the entity. Any method may be used to search the network for references to the entity. Further, any number of channels within the network may be searched as desired. The search may be performed over time and/or so as to simulate searching at a variety of geographical locations. In such a process, data relative to the volatility of a site's performance in the organic channel may be obtained by taking multiple samples and measuring the volatility of their performance (e.g. rank differences).

In at least one example, performing the search may include scoring the results of the search of the network with respect to one or more of the entities referenced in the search results. Additionally or alternatively, the score may also include the channel associated with the search. Additionally or alternatively, this score may include a position at which references to each of the entities are displayed within the search results. Performing the search may also include performing a crawl of the search results related to each of the search terms. In particular, the method may include crawling the search results for each of the search terms and analyzing data associated with the crawl, including on-page information and back link data (e.g. back link URL, anchor text, etc.) for each URL in the search result. Such a crawl may also identify the sentiment of references to each site reference (e.g. the SERP listing for each site as well as the content on the web page referenced in the SERP listing will determine the sentiment of the reference).

Once the internal, external, and/or third party data has been retrieved and the search terms have been searched and scored, a multiplier may be applied at step 240 to determine aggregate share values. Factors included in or considered relevant to the multiplier may include any combination or weighting of the internal, external, and/or third party data retrieved above. For example, the multiplier may include the product of an estimated click rate and volume of search for term. In other examples, sentiment corrections, geography based corrections, volatility based corrections or other corrections may be included in the multiplier as desired, such as industry specific considerations.

The aggregate share values for all the entities referenced in the search may then be combined and the share of voice for each calculated at step 250 by dividing each entity's aggregate share value to the total of all the aggregate share values.

Figure 3:
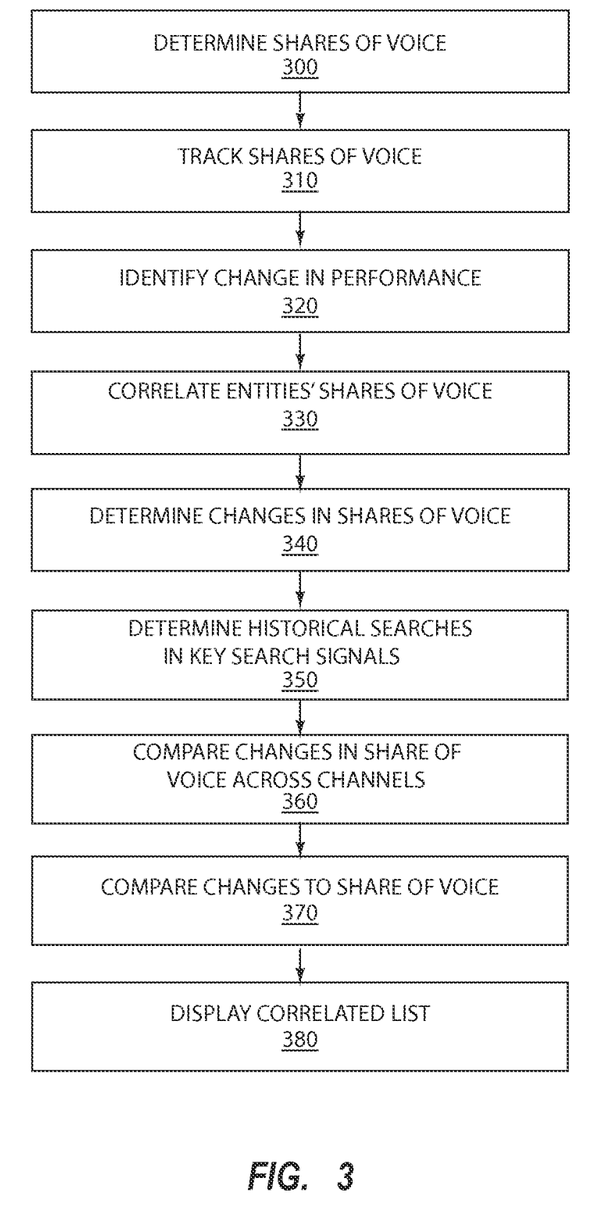
FIG. 3 illustrates an exemplary method for identifying changes in an entity's performance according to one example.

FIG. 3 illustrates an exemplary method for identifying changes in an entity's performance. As illustrated in FIG. 3, the method may begin by determining shares of voice at step 300. Shares of voice may be calculated in any way, including by the exemplary method for determining shares of voice described above with reference to FIG. 2. While shares of voice may be used in correlating and determining performance metrics below, it will be appreciate that any other metric or variable may also be analyzed, including compliance/non-compliance determined according a method described in more detail with reference to FIG. 8.

Thereafter, the shares of voice may be tracked at step 310. Tracking shares of voice for search terms may include determining shares of voice at selected time intervals over a selected time period. Tracking shares of voice over a time period may include determining shares of voice at the selected time period or after the time period has passed.

In order to determine a cause for a change in performance, the change for performance is first identified, as at step 320. Such a change may include a change in revenue. Any other changes in performance may also be identified as desired with respect to the present method. Identifying a change in performance in accordance with step 320 may also include determining a time period of interest associated with the drop in performance. Such a time period may be of any desired length.

As shown in FIG. 3, the method may also include at step 330 correlating the entity's shares of voice for search terms across several channels with other entities' shares of voice for the same search terms across the same channels. These correlations may then be used to isolate potential causes for the change in performance.

For example, as previously introduced, shares of voice for various entities may be tracked over time and across channels for any number of search terms. Tracking shares of voice for various entities may provide a competitive baseline. In particular, at step 340 the method may include determining changes in shares of voice for the search terms for each of the entities for the time period associated with the change in performance. If the entity's share of voice decreased at the same time the competitors' shares of voice have increased, a portion of the change in performance may be attributable to a loss in the entity's share of voice for those search terms. Changes in the relative shares of voice for the entities may be assigned weighted values to be analyzed later based on relative sizes of the changes.

The change in performance may be attributable to other factors, which may also be isolated using correlations of entities' shares of voice for search terms. For example, at step 350 historical searches in key search signals may be determined. Such changes may include such changes as changes in backlinks, page changes, anchor text changes content updates, etc. Changes in the historical searches may be assigned a weighted value to be analyzed later based on relative sizes of the changes.

Further, correlating shares of voice for the entity may facilitate comparison of an entity's share of voice for the search terms across channels at step 360. In particular, if changes in the entity's share of voice across channels are more or less uniform, less of the change in performance may be attributable to changes in performance across the channels. If, however, changes for the entity's share of voice vary significantly between channels, performance within those channels may then be analyzed separately to help isolate causes for the change. In one example, channels may include search engines. In an example, if a change in a share of voice is identified, the share of voice may then be analyzed to determine whether similar changes have occurred across the search engines. If the drop is isolated to a specific search engine, it may be likely an algorithm has changed for that specific search engine and actions can be taken to improve share of voice for that search engine. Changes across channels may be assigned a weighted value to be analyzed later based on relative sizes of the changes.

Changes to share of voice, which are reflected by the weighted values determined in steps 340-350, may then be compared at step 370, to help isolate which of aspect of a change in voice most strongly correlates with the change in performance. At step 380, this correlated list may then be displayed to the user for analysis. Accordingly, by examining signals like competitive baseline and performance across multiple channels of the same type can provide a user with a prioritized list of potential causes of drops and increase in performance.

In addition to correlating changes in performance to changes in voice, the system described above with reference to FIG. 1 may be configured to group search terms into meaningful groupings to allow the entity to understand changes in performance since changes can be isolated to groupings rather than to aggregate references to the entire entity. Such an approach can provide a useful degree of granularity since each grouping represents a meaningful category of data. Further, such an approach can help surface how groupings are trending as well as help identify categories for investigation. The search terms discussed above with reference to FIG. 3 may include groupings of search terms. One exemplary method for grouping search terms will now be discussed in more detail with reference to FIG. 4.

Figure 4:
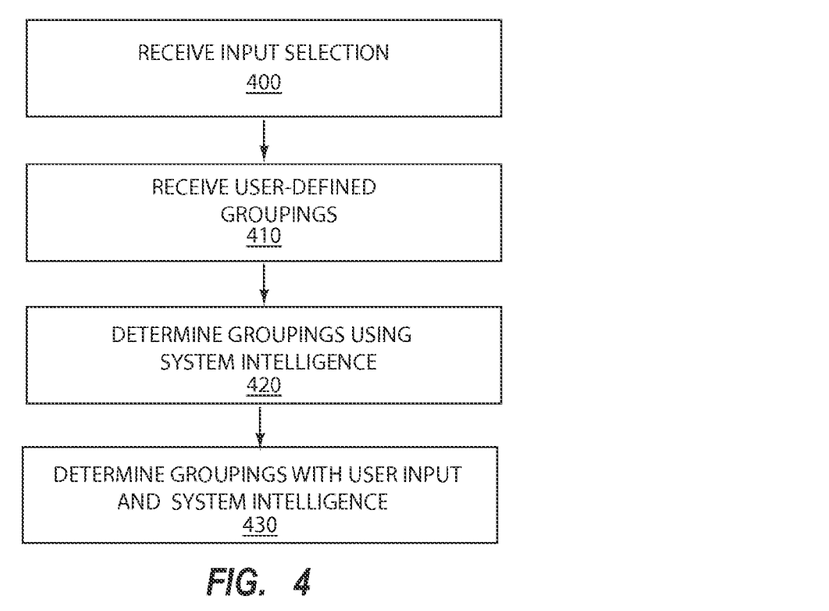
FIG. 4 illustrates a method for determining groupings according to one example.

FIG. 4 illustrates a method for determining groupings according to one example. The method begins at step 400 by receiving an input selection as to whether the groupings will be defined by a user as at step 410, determined by system intelligence as at step 420, or determined by a combination of the two as at step 430. The selection as to how the groupings are to be determined may be received in any desired manner, such as through the use of input/output devices. This input may be received at an initial setup stage, received before each search is performed, or received at any desired time.

With respect to step 410, if the received selection indicates that the groupings are to be user defined, the user may define the groupings in any desired manner. For example, the user may directly define the groupings. In particular, with respect to user-defined groupings, users may be aware of keywords, keyword variants, or keyword categories for actions that are related to the entity, such as traffic, events/interaction with the website including conversion events, purchase/sale, download, signup, or any other actions, compliance/non-compliance. For example, a user may define groups such as keyword groupings based on a keyword category or keyword variant that combine laudatory words, a category of interest, and a geographical category. One such exemplary grouping could include the phrase "best restaurants"+[city] (e.g., best restaurants in San Francisco, best restaurants in New York, etc).

In addition to entering keywords directly, users may also be able to group pages by page type. For example, a user may be able to group product page types, editorial pages, blog posts, or other categories together. In at least one example, a user may create user-defined templates by grouping page types together as desired. Further, user-defining groupings at step 410 may also include receiving input to combine pages by variables such as page name, title, uniform resource locator (URL), sponsored link costs, revenue per visit, time on site, bounce rate, page views, visitors, key business drivers, or other properties that can be provided by the user, internal systems, or third party data. Accordingly, the method may include receiving input to establish various groupings of search parameters as defined by the user.

As introduced, the method may also include determining groupings automatically. Accordingly, with respect to step 420, if the received selection indicates that groupings are to be determined by system intelligence, the system may at least initially receive input to guide the search. In other examples, the determination may be performed automatically without user intervention.

In the case that user guidance is initially provided, the system may receive input to select general parameters for the system to search. For example, the system may receive input selecting the top keywords that drive traffic or volume to the entity. In such an example, the system may automatically group these keywords. Further, the system may also receive input to select page types, page names, uniform resource locators, or other categories or classifications of web pages that affect traffic in a selected manner. Additionally, the system may also receive input to select top pages that dropped in user visits, conversions, or other performance metrics as desired. The system may then automatically generate groupings based on any or all of these inputs. Accordingly the method may include receiving input to establish various groupings of search parameters automatically.

With respect to step 430, if the received selection indicates that groupings are to be determined by a combination of system intelligence and user-defined terms, the system intelligence and user input can be combined in any desired manner. For example, the system may receive the input described above in determining user-defined groupings. Based on the result of the groupings, the system may automatically perform a search to identify keywords, phrases, page types, or any other data that is frequently associated with the user-defined groupings. Other types of search terms includes compliance/non-compliance. The system may then automatically combine the surfaced keywords, phrases, pages types, etc. and the user-defined search terms into groupings that may then be searched again as desired. Further, a frequency analysis may be conducted on the search results with respect to competitors to determine additional keyword variants and/or other correlations. The searching may be performed automatically or may be performed in response to additional input as desired. Accordingly, the method may combine user input and system intelligence to determine groupings to be searched. Further, as described above, search results may be used in further determining and/or refining groupings as desired.

Additionally or alternatively, automatic groupings may be based on seasonality or current events. In particular, some keywords are searched more frequently based on the time of year, such as the searching of terms related to Christmas trees during the months of November and December.

Once a search job has been performed, the results may be analyzed and the groupings managed. For example, the groupings may be analyzed according to the methods discussed above with reference to FIGS. 2 and 3, thereby allowing a user to further narrow and isolate changes in performance in meaningful ways. The method of grouping search terms together may also be used to help surface additional keywords that may be of interest, both with respect to analyze for current performance as well as with respect to identify potential opportunities. One exemplary method for identifying additional search terms of interest will now be discussed in more detail with reference to FIG. 5.

Figure 5:
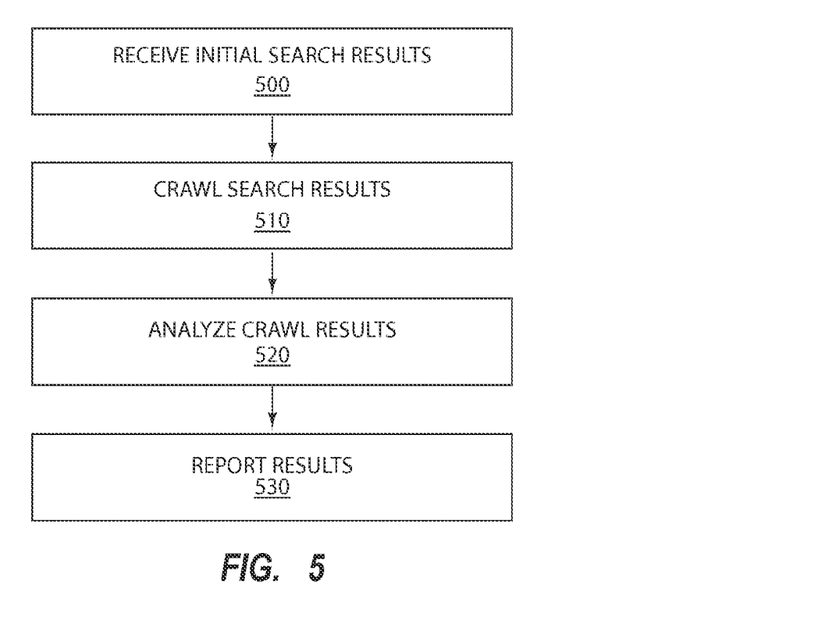
FIG. 5 illustrates a method for identifying additional search terms according to one example.

As illustrated in FIG. 5, a method for identifying additional search terms may be begin by receiving initial search results as a base set of search terms at step 500. In at least one example, the base set of search terms may be received as part of the groupings provided according to the method discussed above with reference to FIG. 4. In other examples, the search results may be based on search terms provided in some other manner, such as by input received from a user.

At step 510 the method continues by crawling the search results, including the URL's returned in the search results as well as any APIs associated with the search and crawling the search results for each of the search terms. As shown at step 520, the method may include analyzing data associated with the crawl, including on-page information and back link data (e.g. back link URL, anchor text, etc) for each URL in the search result. In at least one example, analyzing data associated with the crawl may include performance of a frequency search on the information. A frequency search or other analysis on the crawl data may help identify additional search terms not included in the base set, but that are relevant to the search results. Additionally or alternatively, incoming links from third party websites may be grouped into meaningful page types (based on the content of the page) for the purpose of conducting analysis to understand the value of a link from a given page type or the value to the business of actions related to the entity that are driven from a given page type. These results may provide meaningful insight and actionable opportunities based on aggregated data analysis applied to individual groupings, combinations of groupings, or by comparing groupings.

As shown at step 530, the results of the analysis, which may include the additional search terms discovered through the analysis, are reported. In at least one example, reporting the results may include providing the results for use in any of the methods described above. Additionally or alternatively, the results may be reported by displaying the results to a user. In addition to providing meaningful analysis relative an entity's performance, identifying additional search terms may help identify potential opportunities.

Figure 6:
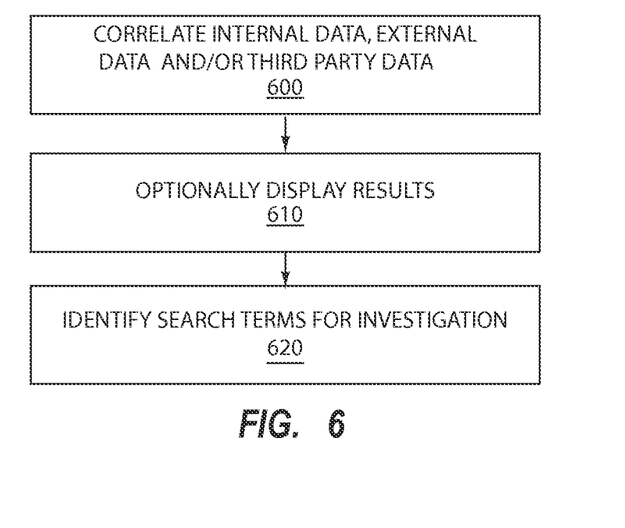
FIG. 6 illustrates a method for identifying opportunities to optimize references according to one example.

As illustrated in FIG. 6, a method for identifying opportunities to optimize references may begin by correlating internal data and external data at step 600. Optionally, third party data may also be included in the correlation. In at least one example, correlating internal and external data includes correlating scores for each of the search terms with respect to references to the entity, the total number of visits related to the network associated with each search term, the number of conversions associated with those visits, the ratio of conversions to visits, and the total value of the conversions associated with the search terms. The search terms may be determined or identified in any suitable manner, including methods described above.

As shown at step 610 the method may include displaying search results to a user. Once the internal and external data have been correlated, search terms may be identified for investigation as at step 620. Identifying search terms for investigation may include identifying search terms for which the references score poorly with respect to the entity. Such an example may include which scores place the references on a second page or worse, on search results.

Conversion rates and/or total values may then be analyzed to determine whether the search terms are worth investigating. For example, if the search terms have a high conversion rate, it may be worth investigating improving the score for those search terms with respect to the entity. Further, if the total value associated with search term is relatively large despite a poor score, this may indicate that improving the score of the search term may be worth investigating. Accordingly, a method for identifying search terms for investigation may include determining a score threshold, such as a page rank score, determining a threshold conversion ratio and determining a threshold total value. If the parameters associated with a score are met and either or both of the conversion threshold or value threshold are met, the search term may automatically be identified for investigation.

Additionally or alternatively, the external data described above may be analyzed to score search results for references to another entity, such as a competitor. The scores associated with the search terms may then be analyzed to determine where another competitor may be weak. For example, if a competitor ranks low on a search term that has significant traffic or visits associated therewith as reflected in the third party data, that search term may be identified for further investigation.

Additionally or alternatively, the external data analyzed to score search results for references to another entity may indicate where the entity is weak. For example, additional search terms may be identified by crawling search results for a given set of search terms, as described above. The additional search terms may then be searched and a score generated for the search results with respect to both the entity and to competitors. If the scores indicate that the competitors score well with respect to those search terms and the entity does not, that determination may indicate the search terms are worth investigating, such as by targeting the search terms in paid searches. In at least one example, a threshold rank may be determined for the entity, such as a rank that indicates that references to the entity are appearing on a third page or worse. Any threshold rank may be used as desired. In such an example, if a competitor scores better than the threshold rank with respect to the search terms and the entity scores worse than the threshold rank, the search terms may be automatically targeted for a paid search.

Additionally or alternatively, third party data may indicate that activity related to certain search parameters has spiked. This spike itself may identify the search terms as being worth investigating.

Figure 7:
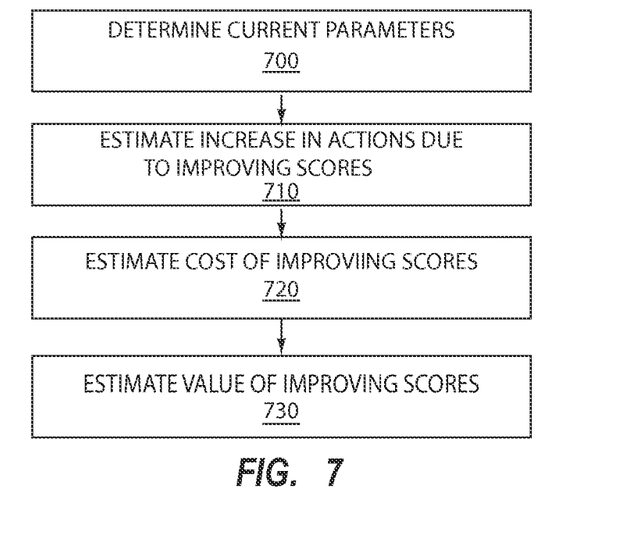
FIG. 7 illustrates a method for forecasting results of an initiative according to one example.

FIG. 7 illustrates a method for forecasting results of an initiative according to one example. The search terms may be generated by a user, may be surfaced according to the method for identifying opportunities described above, or by some other method. As a preliminary step, the search terms or other variables associated with the initiative may be analyzed as described above. Thereafter, as illustrated in FIG. 7, the method may begin by determining the current parameters associated with the search terms for actions related to the entity, as at 700. These parameters may include the internal and external data, such as correlated scores for each of the search terms with respect to references to the entity, the total number of visits related to the network associated with each search term, the number of conversions associated with those visits, the ratio of conversions to visits, and the total value of the conversions associated with the search terms. These parameters may also include third party data.

Once the current parameters for the search terms are determined, at step 710 the method estimates the increase in actions associated with improving scores for the search terms with respect to the entity. These estimates may be made a probabilistic model using data obtained from any of the sources described above. For example, it may be understood that keywords at given positions receive a relatively predictable percentage of the network traffic or visits for that page.

At step 720, the method continues with determining a cost for improving scores. For example, improving scores may include building back links to the entity. Determining a cost of improving scores may include tracking previous increases of back links and correlating previous improvements in rank. A historical regression analysis or other methodology may then be applied to the previous efforts to estimate a cost for improving scores based on the cost and time associated with activities that improve the score.

At step 730, the method continues with determining a value for improving scores using any desired calculation, such as user-defined formulas, probabilistic modeling or any other method. Accordingly, the present method allows marketers or other users to forecast likely outcomes for initiatives.

As a result, marketers may perform a similar analysis for each initiative to estimate likely cost for each initiative as well as a likely return for those initiatives. This may be tracked over time to help determine the effectiveness of the method and to help apply correction factors as desired. Further, the allocation of benefits determined above may be distributed across multiple initiatives, such as equally or proportionally as desired.

Figure 8:
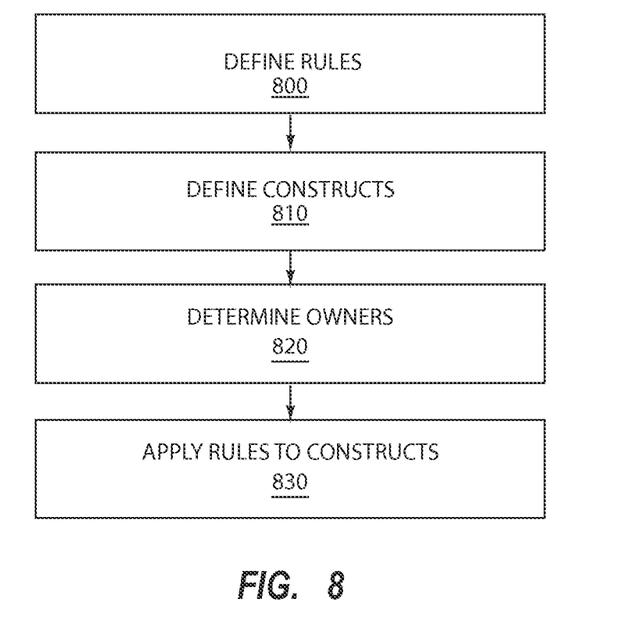
FIG. 8 illustrates a method for determining compliance for optimization of references to an entity.

FIG. 8 illustrates a method for determining compliance for optimization of references to an entity. As illustrated in FIG. 8, the method begins at step 800 defining rules. These rules may include initial default rules, however these may be defined or modified in each instance according to preferences of the entity. In at least one example, the rules can be defined by a user, by the system, or by some combination of the two. Examples of rules include the presence of title tags, size of character tags, and any other rule that may be desired. Such rules may be applied entity wide to help ensure compliance across pages.

FIG. 8 also illustrates the method may also include defining a set of constructs at step 810. These constructs may include any information about the structure of Web Pages related to the entity. For example, the construct may include page templates, site maps, crawl paths, etc. or other constructs that reflect how the entity has organized a site.

At step 820, the method includes determining an owner for each of the components identified in the construct. Each owner may be responsible for the corresponding component and may be alerted when there are problems with the site.

At step 830, the rules are applied to the construct. In at least one example, this may include utilizing a rule engine in a distributed environment in the cloud. In one example, the rule engine may be utilized to apply the rules determined above to the constructs to determine compliance. Further, these steps may be performed via virtual private network and obeying a crawl limit. The method described above may be performed in as a best practice in a staging environment to help ensure compliance before the entity makes any changes, such as site changes. In such an example, by tracking a trend of breaks against the components of the site, the entity can intelligently determine if a specific component is broken. Further, such a process may help an entity identify whether an entire component, such as a template, is not functioning properly rather than determining whether a specific page is not functioning properly. Further, the method described above may be utilized to analyze other entities to determine strengths or weaknesses. The application of the rules can include determining a percentage of the audits that passed. This percentage may then be included as part of the scores described and discussed above that are generated as part of search or analysis of references to the entity.

Accordingly, a compliance engine provide system/apparatus/method for crawling web pages on a site and applying an overall scoring function to generate a score for ops management, in one case this score could a compliance score for the purpose of managing SEO page standards compliance. Compliance may be measured across segmented groupings (e.g., of pages that denote a particular type/category of page, for example, as an ecommerce site, I may measure compliance for each set of pages grouped by product category)

In another example, compliance/non-compliance may be one of the variables correlated in addition or alternatively with shares of voice as described above. Compliance non/compliance may be one of the search terms identified or grouped above. Accordingly, systems and methods may be provided for correlating the change in going from compliance to non-compliance or vice versa by grouping and then correlating that grouping back to SEO metrics (e.g., rank) or business metrics (e.g., visits/conversions/sale dollar value) in order to gauge how a change in compliance status impacts the business Accordingly, a compliance score can be as simple as the number of audit rules that failed, the percentage of failed or passed rules, or could be a sophisticated function combining internal/external/third party data in order to assign business impact/value to the page or groupings of pages that are non-compliant.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modules running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method of managing references to an entity on a network, the computer including a non-transitory computer storage medium, the method comprising:
   determining a score for each of a plurality of search terms with respect to an entity and one or more other entities,
      the score for each of the plurality of search terms for the entity being based on at least a position of a reference to the entity within search results generated using the respective search term and
      the score for each of the plurality of search terms for the other entities being based on at least a position of a reference to the other entities within the search results generated using the respective search term;
   determining shares of voice for the entity and the other entities across at least two of a plurality of organic search channels with respect to the plurality of search terms based on the scores for the plurality of search terms, the plurality of organic search channels selected from a group including blogs, social media, video sharing, mobile content, and search engines;
   correlating shares of voice for the entity and the other entities with respect to the search terms to determine a relative change in share of voice for the entity with respect to the other entities; and
   correlating shares of voice for the entity across the plurality of channels with respect to the search terms to determine relative changes in share of voice for the entity within each of the channels.

2. The method of claim 1, wherein the search results are associated with different geographic locations.

3. The method of claim 1, wherein the shares of voice are further based on a volatility of search results for the search terms.

4. The method of claim 1, further comprising correlating the shares of voice with historical changes in search signals for the references to the entity.

5. The method of claim 4, further comprising determining a change in performance for the entity with respect to the search terms and a time period associated with the change in performance.

6. The method of claim 5, further comprising determining changes in shares of voice for the search terms for the time period associated with the change in performance.

7. The method of claim 6, further comprising correlating the historical changes with the changes in shares of voice for the search terms for the time period to determine an aspect of the changes in shares of voice correlated with the change in performance.

8. The method of claim 1, wherein determining shares of voice includes multiplying the determined shares of voice by a multiplier, wherein the multiplier is one of a sentiment correction, a geography based correction, or a volatility based correction.

9. The method of claim 1, further comprising, when the relative changes in share of voice for the entity within an individual channel is larger than a predetermined value, performing analysis on the individual channel to isolate causes for the relative change in the individual channel.

10. A computer readable medium encoded with a computer program fixed in a non-transitory computer storage medium having computer-executable instructions for causing a computing system to perform operations of optimizing online references to an entity, the operations comprising:
  searching at least two channels on a network for references to the entity and other entities using a plurality of search terms to generate search results, the at least two channels being selected from a group including blogs, social media, video sharing, mobile content, and search engines;
  scoring the references associated with each of the plurality of search terms to generate scores for the references within the search results with respect to the entity and the other entities,
    the score for each of the references within the search results with respect to the entity being based on at least a position of each of the references to the entity within the search results and
    the score for each of the references within the search results with respect to the other entities based on at least a position of each of the references to the other entities within the search results;
  determining shares of voice for the entity and the other entities across each of the at least two channels with respect to the plurality of search terms;
  correlating shares of voice for the entity and the other entities with respect to the search terms to determine a relative change in share of voice for the entity with respect to the other entities based on the scores for the references; and
  correlating shares of voice for the entity across the plurality of channels with respect to the search terms to determine relative changes in share of voice for the entity within each of the channels based on the scores for the references.

11. The computer readable medium of claim 10, wherein using a plurality of search terms to generate search results includes using a plurality of keywords.

12. The computer readable medium of claim 11, wherein using a plurality of keywords further includes crawling previously returned search results and conducting a keyword frequency analysis to identify at least some of the plurality of keywords.

13. The computer readable medium of claim 10, wherein scoring the references associated with each of the plurality of search terms includes determining a keyword rank.

14. The computer readable medium of claim 10, further comprising determining costs for improving the scores of the references within the search results associated with the search terms with respect to the entity.

15. The computer readable medium of claim 14, further comprising;
  determining values for improving the scores of the references within the search results associated with the search terms with respect to the entity; and
  selecting references to be improved based on determining the costs and the values for improving the scoring of the references associated with the search terms with respect to the entity.

16. The computer readable medium of claim 15, further comprising optimizing the scores of the references within the search results associated with the search terms with respect to the entity based on the determining the costs and the values for improving the scores of the references within the search results associated with the search terms with respect to the entity.

17. The computer readable medium of claim 10, further comprising performing a compliance analysis for the entity.

18. The computer readable medium of claim 17, wherein the compliance analysis includes defining rules for the entity, defining constructs for the entity, determining owners for the constructs, and applying the rules to the constructs to determine compliance of the constructs with the rules, wherein applying the rules is performed in a distributed network in the cloud.

19. The computer readable medium of claim 18, wherein applying the rules includes applying the rules by way of a virtual private network.

20. A computer implemented method of managing references to an entity on a network, the computer including a non-transitory computer storage medium, the method comprising:
  determining a score for each of a plurality of search terms with respect to an entity and one or more other entities,
    the score for each of the plurality of search terms for the entity being based on at least a position of a reference to the entity within search results generated using the respective search term, and
    the score for each of the plurality of search terms for the other entities being based on at least a position of a reference to the other entities within the search results generated using the respective search term;
  determining shares of voice for the entity and the other entities across a plurality of search engines based on the scores for the plurality of search terms and a multiplier applied to the scores;
  correlating shares of voice for the entity across the plurality of search engines with respect to the search terms to determine relative changes in the shares of voice for the entity within each of the search engines;
  determining when a share of voice difference between the relative change in the share of voice for the entity with respect to the search terms within a first search engine of the plurality of search engines and the relative change in the share of voice for the entity with respect to the search terms within other search engines of the plurality of search engines is greater than a threshold; and
  when the share of voice difference is greater than a threshold, performing analysis with respect to the first search engine to isolate causes for the relative change in the share of voice for the entity with respect to the search terms within the first search engine,
    the performing the analysis including correlating the share of voice for the entity with respect to the search terms within the first search engine with historical changes in search signals that affect the positions of references to the entity within search results generated using the search terms within the first search engine.

\* \* \* \* \*